Patented Oct. 11, 1932

1,882,298

UNITED STATES PATENT OFFICE

GARRETT H. PETERS, OF WILMINGTON, DELAWARE, ASSIGNOR TO HERCULES POWDER COMPANY, OF WILMINGTON, DELAWARE, A CORPORATION OF DELAWARE

SAFETY GLASS

No Drawing. Application filed September 25, 1931. Serial No. 565,198.

This invention relates to an improvement in safety glass.

Safety glass, as is well known, involves a laminated structure comprising a flexible, transparent sheet, as for example, of celluloid sandwiched between two sheets of glass. The opposing faces of the sheets of glass are adhered to opposite faces of the sheet of transparent, flexible material in order that if the glass is broken the various pieces and splinters of glass will not fly, but will remain adhered to the flexible sheet.

Heretofore, various media have been used for effecting adherence between the flexible sheet and the sheets of glass. However, the media heretofore used have been open variously to a number of objections, more particularly, for example, in that certain media reduce the transparency of the safety glass, either initially or through discoloration from the effect of, for example, light. Other media do not give desirable permanency of adherence, etc., etc.

Now, in accordance with this invention, it has been found that safety glass having desirable characteristics to a high degree may be produced by effecting the adherence of a flexible, transparent sheet to opposite faces of glass through the medium of the substance terpinene-maleic anhydride.

Terpinene-maleic anhydride may be readily produced, for example, by reacting maleic anhydride or maleic acid with terpinene in the presence of heat.

More specifically, terpinene-maleic anhydride may be produced by heating say 480 grams of alpha terpinene with say 294 grams of maleic anhydride or alternatively with an equivalent amount of maleic acid at a temperature to cause it to gently boil, say 150 to 200° C., for a period of about 5 hours. On completion of the heating, the slight excess of alpha terpinene present, and impurities such as dipentene, para-cymene, etc. are removed by distilling off the excess alpha terpinene and impurities under vacuum, say about 15 mm. mercury, and at a temperature at which the terpinene and impurities will distill off, but below that at which the reaction product will distill.

In the production of safety glass in accordance with this invention, the necessary sheets of glass are prepared, as are sheets of suitable or desired transparent, flexible material, as for example, celluloid, cellulose acetate, or the like. A sheet of transparent, flexible material, as celluloid, is then placed or, as it were, sandwiched between two sheets of glass, the opposing faces of which have been coated with terpinene-maleic anhydride. The laminated structure or sandwich so formed is then pressed under suitable pressure and at a temperature of say within the range 60° C.–90° C. When the laminated structure or sandwich has been sufficiently subjected to pressure, it is removed and permitted to cool.

In the application of the terpinene-maleic anhydride to the glass, the terpinene-maleic anhydride may be applied in the form of a solution in a volatile solvent, as for example, acetone, and allowed to dry or it may be rendered sufficiently fluid for application by the addition of heat.

In accordance with this invention, it is contemplated that the terpinene-maleic anhydride may be used alone or in combination with other non-volatile adhesives, as for example, fenchone. Likewise, the terpinene-maleic anhydride may be applied over, for example, a skin coat of nitrocellulose lacquer or gelatin glue and will act as a binder between the flexible, transparent material and the skin coat. The safety glass in accordance with this invention has been found to have excellent resistance to shattering, to have desirable adherence between the transparent sheet and the glass sheets and to rate high in discoloration tests.

What I claim and desire to protect by Letters Patent is:

1. A safety glass including a resilient sheet of transparent material adhered to a sheet of glass through the medium of terpinene-maleic anhydride.

2. A safety glass including a sheet of celluloid adhered to a sheet of glass through the medium of terpinene-maleic anhydride.

3. A safety glass including a resilient sheet of transparent material positioned between sheets of glass and having its opposite faces adhered to opposing faces of the sheets of glass through the medium of terpinene-maleic anhydride.

4. A safety glass including a sheet of celluloid positioned between sheets of glass and having its opposite faces adhered to opposing faces of the sheets of glass through the medium of terpinene-maleic anhydride.

5. A safety glass including a resilient sheet of transparent material adhered to a sheet of glass through the medium of a cement including terpinene-maleic anhydride as an ingredient.

6. A safety glass including a sheet of celluloid positioned between sheets of glass and having its opposite faces adhered to opposing faces of the sheets of glass through the medium of a cement including terpinene-maleic anhydride as an ingredient.

In testimony of which invention I have hereunto set my hand, at Wilmington, Delaware, on this 16th day of September, 1931.

GARRETT H. PETERS.